US012246663B2

(12) United States Patent
Yamaguchi et al.

(10) Patent No.: US 12,246,663 B2
(45) Date of Patent: Mar. 11, 2025

(54) DOOR WIRING MODULE

(71) Applicants: AutoNetworks Technologies, Ltd., Mie (JP); Sumitomo Wiring Systems, Ltd., Mie (JP); SUMITOMO ELECTRIC INDUSTRIES, LTD., Osaka (JP)

(72) Inventors: Koji Yamaguchi, Osaka (JP); Housei Mizuno, Osaka (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

Patent file contains an affidavit/declaration under 37 CFR 1.130(b).

(21) Appl. No.: 18/029,129

(22) PCT Filed: Oct. 5, 2021

(86) PCT No.: PCT/JP2021/036811
§ 371 (c)(1),
(2) Date: Mar. 29, 2023

(87) PCT Pub. No.: WO2022/085435
PCT Pub. Date: Apr. 28, 2022

(65) Prior Publication Data
US 2023/0365080 A1    Nov. 16, 2023

(30) Foreign Application Priority Data
Oct. 19, 2020    (JP) .................................. 2020-175392

(51) Int. Cl.
*B60R 16/027*    (2006.01)
*B60J 5/04*    (2006.01)
(Continued)

(52) U.S. Cl.
CPC ........... *B60R 16/027* (2013.01); *B60J 5/0413* (2013.01); *B60R 16/0222* (2013.01); *H01B 7/08* (2013.01)

(58) Field of Classification Search
CPC .. B60R 16/027; B60R 16/0222; B60J 5/0413; H01B 7/08
See application file for complete search history.

(56) References Cited

U.S. PATENT DOCUMENTS

| 2012/0169083 A1 | 7/2012 | Matsumoto et al. |
| 2015/0283962 A1 | 10/2015 | Kobayashi et al. |
| 2022/0017026 A1* | 1/2022 | Yamaguchi ......... B60R 16/0215 |

FOREIGN PATENT DOCUMENTS

| JP | 2008-284966 | 11/2008 |
| JP | 2011-25915 | 2/2011 |

(Continued)

OTHER PUBLICATIONS

International Search Report issued in International Patent Application No. PCT/JP2021/036811, dated Nov. 30, 2021.
(Continued)

*Primary Examiner* — Jared Fureman
*Assistant Examiner* — Duc M Pham
(74) *Attorney, Agent, or Firm* — Greenblum & Bernstein, P.L.C.

(57) ABSTRACT

A door wiring module includes: a first service hole cover covering a first service hole formed in an inner panel; a second service hole cover covering a second service hole formed in the inner panel; and a plurality of wiring members, wherein the plurality of wiring members include: a first
(Continued)

wiring member held by the first service hole cover to be directed to a first door apparatus; and a second wiring member held by the second service hole cover to be directed to a second door apparatus, and the plurality of wiring members include a connection route portion connecting the first service hole cover and the second service hole cover, and being bendable.

8 Claims, 3 Drawing Sheets

(51) Int. Cl.
*B60R 16/02* (2006.01)
*H01B 7/08* (2006.01)

(56) References Cited

FOREIGN PATENT DOCUMENTS

| | | |
|---|---|---|
| JP | 2015-50855 | 3/2015 |
| JP | 2015-71333 | 4/2015 |
| JP | 2020-83075 | 6/2020 |
| WO | 2014/073251 | 5/2014 |
| WO | 2020/059694 | 3/2020 |

OTHER PUBLICATIONS

International Preliminary Report on Patentability issued in International Patent Application No. PCT/JP2021/036811, dated Apr. 13, 2023.

Japan Official Action received in JP Application No. 2020-175392, dated Jul. 11, 2023.

* cited by examiner

DOOR WIRING MODULE

TECHNICAL FIELD

The present disclosure relates to a door wiring module.

BACKGROUND ART

Patent Document 1 discloses a door wiring module including: a door functional planar member incorporated between a door panel and a design trim; a wiring member held by the door functional planar member; and an exterior member as a portion of the wiring member extending to an outer side from the door functional planar member in which a portion incorporated into a door is held. Patent Document 1 exemplifies a case where the door functional planar member is a component blocking an opening formed in an inner penal of a door panel.

PRIOR ART DOCUMENTS

Patent Document(s)

Patent Document 1: Japanese Patent Application Laid-Open No. 2020-83075

SUMMARY

Problem to be Solved by the Invention

The opening formed in the inner panel is used for an operation of connecting a wiring member and an electrical apparatus in a door, for example. It is considered that when a vehicle rank is different and a size of a door is different, a size of the opening is also changed in accordance with a front-back length of the door. Herein, it is required to be able to deal with a difference of the size of the door more easily in the door wiring module.

Accordingly, an object of the present disclosure is to make a door wiring module be able to easily deal with a difference of a size of a door.

Means to Solve the Problem

A door wiring module according to the present disclosure is a door wiring module assembled to a vehicle door panel including an outer panel and an inner panel, including: a first service hole cover covering a first service hole formed in the inner panel; a second service hole cover covering a second service hole formed in the inner panel; and a plurality of wiring members, wherein the plurality of wiring members include: a first wiring member held by the first service hole cover to be directed to a first door apparatus; and a second wiring member held by the second service hole cover to be directed to a second door apparatus, and the plurality of wiring members include a connection route portion connecting the first service hole cover and the second service hole cover, and being bendable.

Effects of the Invention

According to the present disclosure, a door wiring module can be made to easily deal with a difference of a size of a door.

DESCRIPTION OF EMBODIMENT(S)

Description of Embodiment of Present Disclosure

Figure 1:
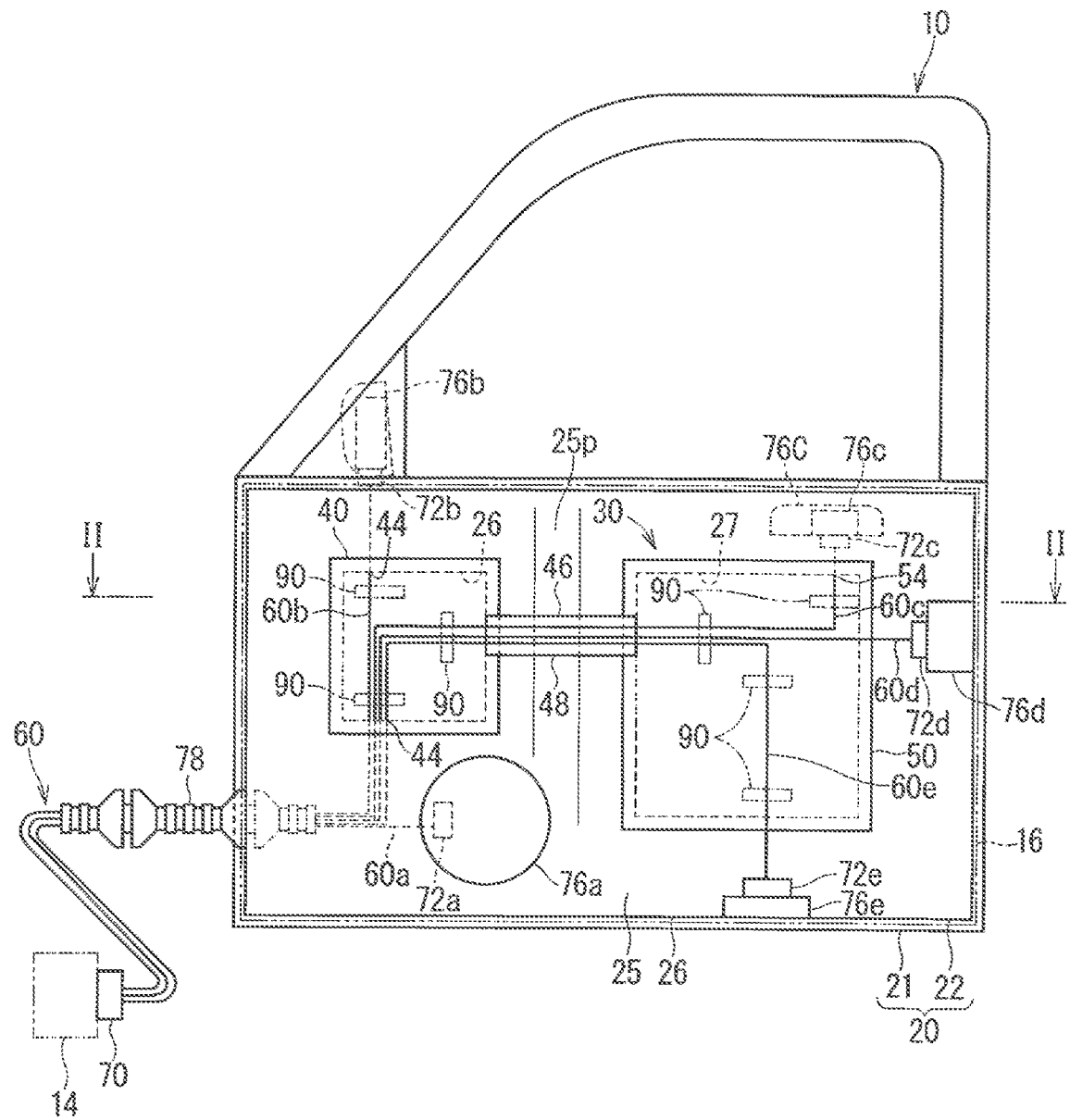
FIG. 1 is a schematic side view illustrating a door into which a door wiring module according to an embodiment is incorporated.

Embodiments of the present disclosure are listed and described firstly.

A door wiring module according to the present disclosure is as follows.

(1) A door wiring module assembled to a vehicle door panel including an outer panel and an inner panel includes: a first service hole cover covering a first service hole formed in the inner panel; a second service hole cover covering a second service hole formed in the inner panel; and a plurality of wiring members, wherein the plurality of wiring members include: a first wiring member held by the first service hole cover to be directed to a first door apparatus; and a second wiring member held by the second service hole cover to be directed to a second door apparatus, and the plurality of wiring members include a connection route portion connecting the first service hole cover and the second service hole cover, and being bendable.

According to the present disclosure, easily achieved is a configuration that the first service hole cover covers the service hole, thus the first wiring member can be connected to the first door apparatus, and the second service hole cover covers the second service hole, thus the second wiring member can be connected to the second door apparatus. At this time, the connection route portion can be extended or bended in accordance with a distance from the first service hole to the second service hole. Thus, when the distance from the first service hole to the second service hole is changed for plural types of doors each having a different size, the same type of door wiring module can be incorporated into such doors. Thus, a door wiring module can be made to easily deal with a difference of a size of a door.

(2) In the door wiring module according to (1), it is also applicable that the first wiring member is guided from a vehicle body apparatus toward the first door apparatus via the first service hole cover, the second wiring member is guided from a vehicle body apparatus toward the second door apparatus via the first service hole cover and further the second service hole cover, and the connection route portion includes a portion of the second wiring member provided between the first service hole cover and the second service hole cover. In this case, it is possible to collect the first wiring member and the second wiring member from the vehicle body apparatus to the first service hole cover, and then branch them to be connected to the first door apparatus and the second door apparatus, thus a lead-out operation of the first wiring member and the second wiring member can be easily performed. A part of the second wiring member in an extension direction can connect the first service hole cover and the second service hole cover.

(3) In the door wiring module according to (1) or (2), the first wiring member may include a door mirror wiring member connected to an electrical door mirror as the first door apparatus. In this case, the first wiring member held by the first service hole cover can be easily connected to the electrical door mirror provided on a front side of the door in many cases.

(4) The door wiring module according to any one of (1) to (3), the second wiring member may include at least one of a door locking wiring member connected to a door locking actuator as the second door apparatus and/or a door handle wiring member connected to a door handle apparatus as the second door apparatus. In this case, the second wiring member held by the second service hole cover can be easily connected to at least one of the door locking actuator and/or the door handle apparatus provided on a back side of the door in many cases.

(5) In the door wiring module according to any one of (1) to (4), the connection route portion may be a portion where a part of the plurality of wiring members in an extension direction is arranged in a flat state. The connection route portion can be easily bended, thus adjustment can be easily performed in accordance with a distance from the first service hole to the second service hole.

(6) In the door wiring module according to (5), it is also applicable that the connection route portion includes a base member keeping a part of the plurality of wiring members in an extension direction in a flat state, and the base member is fixed to the first service hole cover and the second service hole cover. In this case, even when the first service hole cover and the second service hole cover are pulled in directions away from each other, pull force thereof is received by the base member. Accordingly, large pull force acting on the wiring member in the connection route portion is suppressed.

(7) In the door wiring module according to (6), it is also applicable that the base member is a bendable sheet material, and a part of the plurality of wiring members in an extension direction is fixed to the sheet material. Accordingly, the connection route portion can be kept as thin as possible by the sheet material.

(8) In the door wiring module according to any one of (5) to (7), the connection rout portion may be provided to cross over a protrusion portion of the inner panel between the first service hole and the second service hole. In the protrusion portion of the inner panel, a space for locating the wiring member, for example, is reduced. The flat connection route portion crosses over the protrusion portion, thus the wiring member can be disposed in a narrow space.

Details of Embodiment of Present Disclosure

Specific examples of a door wiring module of the present disclosure are described hereinafter with reference to the drawings. The present disclosure is not limited to these examples, but is indicated by claims, and it is intended that meanings equivalent to claims and all modifications within a scope of claims are included.

Embodiment

Figure 2:
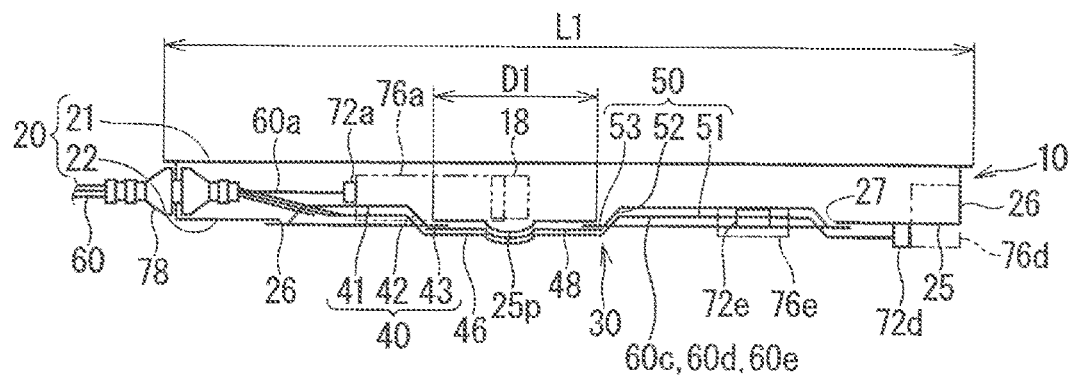
FIG. 2 is a schematic cross-sectional view of the door wiring module along a II-II line in FIG. 1.
Figure 3:
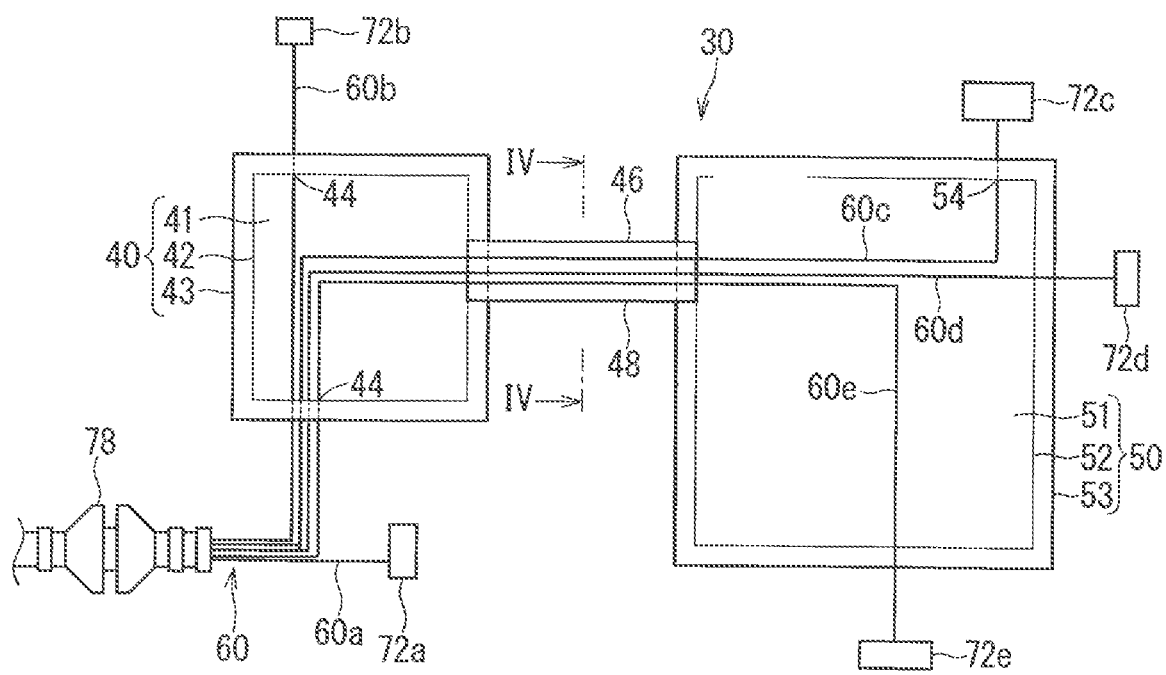
FIG. 3 is a schematic side view illustrating a door wiring module 30.
Figure 4:
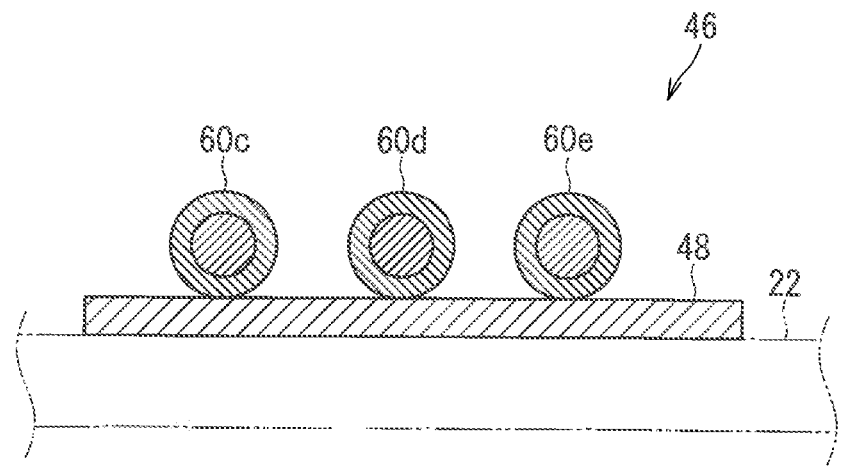
FIG. 4 is a schematic cross-sectional view of the door wiring module along a IV-IV line in FIG. 3.

A door wiring module according to an embodiment is described hereinafter. FIG. 1 is a schematic side view illustrating a door 10 into which a door wiring module 30 according to the embodiment is incorporated. FIG. 2 is a schematic cross-sectional view of the door wiring module 30 along a II-II line in FIG. 1. FIG. 3 is a schematic side view illustrating the door wiring module 30. FIG. 4 is a schematic cross-sectional view of the door wiring module 30 along a IV-IV line in FIG. 3. The wiring member illustrated by one line may be one wiring member or a plurality of wiring members in each drawing except for FIG. 4.

Firstly, an outline of a door 10 in a vehicle is described. The door 10 is formed into a flat shape as a whole, and is a part openable and closable to partition an inner side and outer side of a vehicle. The door 10 is assumed to be a driver side door, a passenger's side door, and a rear seat door, for example. The door 10 includes a vehicle door panel 20, a design trim 16, and a door wiring module 30.

The vehicle door panel 20 includes an outer panel 21 and an inner panel 22. The outer panel 21 is provided to a portion of the door 10 facing an outer side of the vehicle. The outer panel 21 is a part constituting an outer appearance of the vehicle together with a body of the vehicle. The inner panel 22 is provided on a vehicle interior side of the outer panel 21. The inner panel 22 includes a side plate part 23 and a main plate part 25. The side plate part 23 is a part protruding from the outer panel 21 to the inner side of the vehicle. The main plate part 25 is a part continuing into the side plate part 23, and extends along the outer panel 21 with a distance from the outer panel 21. A space is formed between the outer panel 21, the main plate part 25, and the side plate part 23. A door apparatus provided to the door 10 is disposed and a window is housed in the space. A first service hole 26 and a second service hole 27 are provided to the main plate part 25 of the inner panel 22. Each of the first service hole 26 and the second service hole 27 has an opening on both surface sides of the inner panel 22. Thus, an operator can have access to a space in the vehicle door panel 20 through the first service hole 26 or the second service hole 27. The operator can easily perform an operation in the space in the vehicle door panel 20 such as an operation of leading out the wiring member or an operation of connecting the wiring member to the door apparatus, for example, by using the first service hole 26 or the second service hole 27.

The first service hole 26 and the second service hole 27 are formed separately from each other. In the present embodiment, the first service hole 26 and the second service hole 27 are formed separately in a front-back direction of the vehicle.

More specifically, the first service hole 26 and the second service hole 27 are set to have a size to such an extent that the operator can pass his/her hand, that is, a minimum opening width of 10 cm or preferably 15 cm or more, for example. In the example illustrated in FIG. 1, the first service hole 26 and the second service hole 27 are formed into a rectangular shape. The opening of the second service hole 27 is larger than that of the first service hole 26. The first service hole 26 and the second service hole 27 may have a circular shape or a polygonal shape such as a triangular shape. The opening of the first service hole 26 may be larger than that of the second service hole 27, or they may also have the same size.

The first service hole 26 is formed in a position in the inner panel 22 closer to a front side. The second service hole 27 is formed in a position in the inner panel 22 closer to a back side. The second service hole 27 is located on a back side of the vehicle in a front-back direction with a distance from the first service hole 26. The first service hole 26 and the second service hole 27 are away from each other by a distance D1. The distance D1 is set to have a size corresponding to a vehicle front-back length L1 of the vehicle door panel 20.

A portion of the inner panel 22 located between the first service hole 26 and the second service hole 27 is formed in a protrusion portion 25p protruding toward a side opposite to the outer panel 21 (that is to say, the vehicle interior side). The protrusion portion 25p is formed along an up-down direction. The protrusion portion 25p is formed by curving a portion of the inner panel 22 extending in the up-down direction between the first service hole 26 and the second service hole 27 so as to be concaved to a side opposite to the outer panel 21 by a press working, for example. Thus, when the protrusion portion 25p is observed from an inner side of the vehicle door panel 20, a concave groove extending along the up-down direction is observed. A rail 18 may be provided along this concave groove to liftably support a runner for going up and down a window (refer to FIG. 2). It is not necessary to form such a protrusion portion 25p. The portion of the inner panel 22 between the first service hole 26 and the second service hole 27 may be flatly formed, or may also be formed into a shape concaved when seen from the vehicle interior side.

The design trim 16 is apart provided to a portion of the door 10 facing the inner side of the vehicle to constitute the interior of the vehicle. An inner handle and an operation part of an in-vehicle apparatus, for example, are attached to the design trim 16.

The door wiring module 30 assembled to the vehicle door panel 20 described above includes a first service hole cover 40, a second service hole cover 50, and a plurality of wiring members 60.

The first service hole cover 40 is formed into a shape covering the first service hole 26. The first service hole cover 40 is a flat resin component extending to be equal to or larger than the first service hole 26. The first service hole cover 40 may extend to have a shape similar to that of the opening of the first service hole 26. The first service hole cover 40 is formed into a shape covering the first service hole 26. Accordingly, the first service hole cover 40 can partition the inner side and outer side of the vehicle. The attachment state is held by screwing, a locking structure, or adhesion, for example, in a state where the first service hole cover 40 is attached to the first service hole 26 of the inner panel 22. For example, when a peripheral part of the first service hole cover 40 overlapped with the inner panel 22 is bonded to the inner panel 22, a gap therebetween can be covered as possible.

The second service hole cover 50 is formed into a shape covering the second service hole 27. The second service hole cover 50 is a flat resin component extending to be equal to or larger than the second service hole 27. The second service hole cover 50 may extend to have a shape similar to that of the opening of the second service hole 27. A role and an attachment structure of the second service hole cover 50 on the second service hole 27 are similar to those of the first service hole cover 40 on the first service hole 26 described above.

The first service hole cover 40 and the second service hole cover 50 partition a space on the inner side of the vehicle between the outer panel 21 and the inner panel 22. A window exposed to a rainwater environment is housed in the space, and a slit-like opening through which the window goes in and out is formed on an upper side of the space. Thus, the space is a space which water may enter. The space is a space which may be connected to an outer space, thus is also a space which a wind noise, for example, may enter from outside. Thus, it is sufficient that the first service hole cover 40 and the second service hole cover 50 are provided as members for completely partitioning a vehicle interior space and an outer space with the inner panel 22.

More specifically, the first service hole cover 40 includes a cover body part 41, a frame part 42, and a flange part 43. The first service hole cover 40 is a molded component made up of resin such as polypropylene (PP), for example. The first service hole cover 40 may be a component made up of melted resin injected in a mold and injection-molded or a compacted component made up of a non-woven cloth, for example, heated and compressed between simple molds. It is sufficient that the first service hole cover 40 has rigidity to such an extent as to keep a planarly extended state.

The cover body part 41 is a part planarly extending to a range equal to or smaller (slightly smaller) than the first service hole 26. The frame part 42 is formed to protrude to a side of one main surface (inner side of the vehicle) of the cover body part 41 from an outer edge of the cover body part 41. The flange part 43 is formed to protrude to a side of an outer periphery from an outer edge of the frame part 42. The frame part 42 is formed to extend to an outer side of the cover body part 41 from the cover body part 41 toward the flange part 43. The cover body part 41 is disposed on an inner side of the first service hole 26 (closer to a side of the outer panel 21 than the main plate part 25) while the first service hole cover 40 is attached to a portion of the inner panel 22 where the first service hole 26 is formed, the flange part 43 is disposed on an outer side of the first service hole 26 (closer to the inner side of the vehicle than the main plate part 25), and the frame part 42 connects the cover body part 41 and the flange part 43. Accordingly, the frame part 42 and the flange part 43 cover a portion between an edge portion of the cover body part 41 and an inner edge portion of the first service hole 26.

The second service hole cover 50 includes a cover body part 51, a frame part 52, and a flange part 53. The cover body part 51, the frame part 52, and the flange part 53 have a configuration similar to the cover body part 41, the frame part 42, and the flange part 43 described above except that they have a configuration matching the second service hole 27.

Wiring passing parts 44 and 54 through which a wiring member 60 passes may be formed in the first service hole cover 40 and the second service hole cover 50. The wiring member 60 passes through the wiring passing parts 44 and 54, thus the wiring member 60 can be disposed in both spaces partitioned by the inner panel 22, the first service hole cover 40, and the second service hole cover 50. The wiring passing parts 44 and 54 may be holes passing through both surfaces of the first service hole cover 40 or the second service hole cover 50. The wiring passing parts 44 and 54 may be concave portions formed to be concaved to an inner side from an edge of the first service hole cover 40 or second service hole cover 50. It is sufficient that the wiring passing parts 44 and 45 are formed in the cover body parts 41 and 51 or the frame parts 42 and 52 in the service hole covers 40 and 50. Herein, the wiring passing parts 44 and 54 are formed in the frame parts 42 and 52.

The plurality of wiring members 60 connect the door apparatus and a vehicle body apparatus 14 provided to a vehicle body to supply electrical power to the door apparatus or transmit a signal between the door apparatus and the vehicle body apparatus 14. The wiring member 60 may be an electrical wire 60. A covering wire having a core wire 61 made up of a conductor with a covering layer 62 around the core wire 61 can be used as the electrical wire 60 (refer to FIG. 4). The core wire 61 may be a single core wire or a stranded wire. A type of the electrical wire 60 is not particularly limited, but can include a single wire or a composite wire. The single wire is an electrical wire having one conductive route. The composite wire is an electrical wire having a plurality of conductive routes. Applicable as the composite wire is a twisted wire or a composite cable, for example, formed of a plurality of single wires combined with each other. The wiring member 60 may include an optical fiber cable, for example.

More specifically, one end portions of the plurality of wiring members 60 extend from the door 10 in a bundled state via a part of the door 10 (in the example illustrated in FIG. 1, the side plate part 23 on a side of a door hinge), and is led inside the vehicle body. One end portions of the plurality of wiring members 60 are assumed to be connected to the vehicle body apparatus 14 or a relay connector provided to an end portion of a wiring member extending from a vehicle body apparatus via a vehicle body side connector 70, for example. The vehicle body apparatus 14 is not particularly limited, but is assumed to be an electric control unit (ECU) or a battery, for example. A grommet 78 may be attached to a portion of the plurality of wiring members 60 extending between the door 10 and the vehicle body. In the example illustrated in FIG. 1, the grommet 78 is a so-called a through grommet, and is held in a state of being inserted into a through hole formed in the side plate part 23. Accordingly, ingress of water through the through hole is suppressed. An adhesive tape, for example, may be wound around one end portions of the plurality of wiring members 60. An exterior member such as a corrugate tube may be attached to one end portions of the plurality of wiring members 60.

The present embodiment indicates an example that the wiring member 60 is led into the vehicle door panel 20 from the vehicle body through the through hole, and is led to an outer side of the vehicle door panel 20 through the first service hole 26 or the second service hole 27 in accordance with a position of the door apparatus as a connection destination. Differing from the present example, it is also applicable that the wiring member is disposed along a surface of the inner panel 22 on the vehicle interior side, and is led into the vehicle door panel 20 through the first service hole 26 or the second service hole 27 in accordance with a position of the door apparatus as a connection destination.

When the door 10 is openably and closably supported by the vehicle body via a hinge, the through hole described above is provided to a portion of the door 10 on a side of the hinge. However, the door 10 may be slid with respect to the vehicle body to be openably and closably supported by the vehicle body.

The plurality of wiring members 60 extend from the grommet 78 on a way from one end portion to the other portion, and are branched and extend toward the door apparatus as connection destinations, respectively. Connectors 72a, 72b, 72c, 72d, and 72e corresponding to the door apparatuses as the connection destinations, respectively, are provided to each end portion of a branch destination of the plurality of wiring members 60. The connectors 72a, 72b, 72c, 72d, and 72e are connected to connectors provided to door apparatuses 76a, 76b, 76c, 76d, and 76e, respectively. End portions of the branch destinations of the plurality of wiring members 60 may be directly connected to the door apparatuses 76a, 76b, 76c, 76d, and 76e, respectively.

The door apparatus 76a is a speaker apparatus 76a incorporated into the door 10, for example. The speaker apparatus 76a is provided in a position lower than the first service hole 26 in the inner panel 22. For example, the connector on a side of the speaker apparatus 76a is provided to the inner space of the vehicle door panel 20. In the description hereinafter, the wiring member 60 connected to the speaker apparatus 76a via the connector, for example, is referred to as the wiring member 60a in some cases. Such a wiring member 60a is assumed to be an electrical wire transmitting a sound signal.

The door apparatus 76b is an apparatus provided in a position of the door 10 closer to a front side in relation to a center thereof in the front-back direction, for example. The door apparatus 76b is an electrical door mirror 76b, for example. The electrical door mirror 76b is provided to a front portion of the door, and more specifically, in a position on a front side of a closed window. An actuator for changing a direction of a mirror and an actuator for housing and expanding an electrical door are incorporated into the electrical door mirror 76b. Connectors on a side of these actuators are provided to the inner space of the vehicle door panel 20. In the description hereinafter, a door mirror wiring member in the wiring member 60 connected to the electrical door mirror 76b via the connector, for example, is referred to as the wiring member 60b in some cases. Such a wiring member 60b is assumed to be an electrical wire supplying electrical power to the actuators described above.

The door apparatus 76c is an apparatus provided in a position of the door 10 closer to aback side in relation to the center thereof in the front-back direction, for example. The door apparatus 76c is a door handle apparatus 76c, for example. That is to say, a handle 76C for opening and closing the door 10 is provided to the door 10. The handle 76C is provided to the outer panel 21 to be exposed to an outer side of the vehicle. The door handle apparatus 76c is a sensor detecting an opening-closing operation of a key, a sensor detecting an operation of an outer handle, an antenna device performing at least one of transmission and/or reception of a signal to and/or from a key-side antenna device, a switch provided to the handle 76C (for example, a switch for releasing a door lock in accordance with an authorization result on a wireless communication key), for example. A connector on a side of the door handle apparatus 76c is provided to an inner portion of the outer panel 21. In the description hereinafter, a door handle wiring member in the wiring member 60 connected to the door handle apparatus 76c via the connector is referred to as the wiring member 60c in some cases. Such a wiring member 60c is assumed to be an electrical wire supplying electrical power or transmitting a signal to the door handle apparatus 76c.

The door apparatus 76d is an apparatus provided in a position of the door 10 closer to the back side in relation to the center thereof in the front-back direction, for example. The door apparatus 76d is a door locking actuator 76d, for example. That is to say, a door locking device for locking and unlocking the door 10 is incorporated into the vehicle body, and the door locking actuator 76d is provided to the door locking device in the door 10. A connector on a side of the door locking actuator 76d may be provided on the outer side (inner side of the vehicle) of the inner panel 22. In the description hereinafter, a door locking wiring member in the wiring member 60 connected to the door locking actuator 76d via the connector is referred to as the wiring member 60d in some cases. Such a wiring member 60d is assumed to be an electrical wire supplying electrical power to the door locking actuator 76d.

The door apparatus 76e is an apparatus provided in a position of the door 10 closer to the back side in relation to the center thereof in the front-back direction, for example.

The door apparatus 76e is a foot lamp 76e lighting feet when the door 10 is opened, for example. A connector on a side of the foot lamp 76e may be provided on the outer side (inner side of the vehicle) of the inner panel 22. In the description hereinafter, the wiring member 60 connected to the foot lamp 76e is referred to as the wiring member 60e in some cases. Such a wiring member 60e is assumed to be an electrical wire supplying electrical power to the foot lamp 76e.

In the present example, the electrical door mirror 76b described above is an example of a first apparatus, that is particularly a first apparatus provided in a position closer to the front side of the door 10. Each of the handle apparatus 76c, the door locking actuator 76d, the foot lamp 76e is an example of a second apparatus, that is particularly a second apparatus provided in a position closer to the back side of the door 10.

All of the door apparatuses 76a, 76b, 76c, 76d, and 76e need not necessarily be provided, however, some of them may be omitted. Positions of the door apparatuses 76a, 76b, 76c, 76d, and 76d may be changed in accordance with functional or design convenience. For example, the speaker apparatus 76a may be provided closer to the back side of the door 10. The other door apparatus such as various types of switching apparatus (window opening-closing switch and door locking opening-closing switch, for example), a receiving antenna receiving power supply from an in-vehicle apparatus in a non-contact manner, a communication apparatus performing wireless communication with an in-vehicle apparatus, and an in-vehicle door handle apparatuses, for example, may be provided.

The plurality of wiring members 60 include a wiring member according to the door apparatus provided to the door 10. The wiring member 60b described above is an example of the first wiring member 60b, and the wiring members 60c, 60d, and 60e are examples of the second wiring member. The wiring member 60 may include a wiring member which is not connected to a vehicle body apparatus but connects the door apparatuses.

The plurality of wiring members 60 are branched in accordance with the door apparatuses 76a, 76b, 76c, 76d, and 76e described above on a way from one end portion to the other portion.

In the present embodiment, the wiring member 60a is branched from the other wiring members 60b, 60c, 60d, and 60e in a portion extending from the grommet 78 in the door panel 20. The wiring member 60a is connected to a connector on a side of the speaker apparatus 76a in a lower side of the first service hole 26 in the door panel 20.

The wiring member 60b as the example of the first wiring member is held by the first service hole cover 40 to be directed to the electrical door mirror 76b as the example of the first door apparatus. That is to say, the wiring member 60b is guided toward the electrical door mirror 76b from the vehicle body apparatus 14 via the first service hole cover 40. It is sufficient that the covers 40 and 50 guide the wiring member 60 toward an area near the door apparatus as the connection destination, thus the wiring member 60 may be bended between the covers 40 and 50 and the door apparatus as the connection destination. The wiring member 60b may also be bended between the first service hole cover 40 and the electrical door mirror 76b.

The wiring members 60c, 60d, and 60e as the examples of the second wiring member are held by the second service hole cover 50 to be directed to the door handle apparatus 76c, the door locking actuator 76d, and the foot lamp 76e as the examples of the second door apparatus, respectively.

More specifically, the wiring members 60c, 60d, and 60e are guided to be directed to the door handle apparatus 76c, the door locking actuator 76d, and the foot lamp 76e, respectively, from the vehicle body apparatus 14 via the first service hole cover 40 and further the second service hole cover 50. All of the wiring members 60c, 60d, and 60e need not necessarily pass through the first service hole cover 40. Also applicable is a configuration that some or all of the wiring members 60c, 60d, and 60e are guided by the second service hole cover 50 from the vehicle body apparatus 14 without passing through the first service hole cover 40. When applied is the configuration that some or all of the wiring members 60c, 60d, and 60e reach the second service hole cover 50 via the first service hole cover 40, a portion of the wiring members 60c, 60d, and 60e connecting the first service hole cover 40 and the second service hole cover 50 can be used as the connection route portion 46 described hereinafter.

More specifically, the wiring members 60b, 60c, 60d, and 60e are led to the outer side (inner side of the vehicle) from the inner side of the vehicle door panel 20 through the wiring passing part 44 formed in the first service hole cover 40. Herein, the wiring passing part 44 is formed in a lower portion of the frame part 42 in the first service hole cover 40. In the vehicle door panel 20, the wiring members 60b, 60c, 60d, and 60e extending from the grommet 78 are branched to an upper side of the wiring member 60a, and led to an outer surface (a surface on the vehicle interior side) of the first service hole cover 40 through the wiring passing part 44 described above of the first service hole cover 40. The wiring members 60b, 60c, 60d, and 60e are held by the first service hole cover 40. The wiring members 60b, 60c, 60d, and 60e may also be held by the first service hole cover 40 along a predetermined route. For example, it is also applicable that the wiring member 60b is branched from the wiring members 60c, 60d, and 60e on the first service hole cover 40, and the wiring members 60b, 60c, 60d, and 60e are held so that the wiring member 60b is directed to the upper side and the wiring members 60c, 60d, and 60e are directed to the second service hole cover 50 (back side).

A structure of holding the wiring members 60b, 60c, 60d, and 60e on the first service hole cover 40 is not particularly limited as long as at least a part of the wiring members 60b, 60c, 60d, and 60e can be held in a predetermined position on the first service hole cover 40. The holding state of the wiring members 60b, 60c, 60d, and 60e on the first service hole cover 40 may be a contact area fixation state or a non-contact area fixation state.

Herein, the contact area fixation state indicates that a portion where the wiring member 60 and a fixation target have contact with each other is stuck and is not separated, thus the wiring member 60 and the fixation target is kept in a fixed state. Applicable as the state of the contact area fixation are a contact area indirect fixation and a contact area direct fixation. The contact area indirect fixation indicates that the wiring member 60 and the fixation target are indirectly stuck and fixed via an intervening member such as an adhesive agent, a gluing agent, and a double-sided adhesive tape provided therebetween. The contact area direct fixation indicates that the wiring member 60 and the fixation target are directly stuck and fixed without an intervention of the adhesive agent, for example, which is separately provided. Assumed in the contact area direct fixation is that resin included in at least one of the wiring member 60 and/or the fixation target is melted, thus the wiring member 60 and the fixation target are stuck and fixed, for example.

The non-contact area fixation indicates the fixing state which is not the contact area fixation. For example, a sewing thread, the other sheet material, or an adhesive tape presses the wiring member 60 toward the fixation target, or a sewing thread, the other sheet material, or an adhesive tape surrounds the wiring member 60 and the fixation target, thereby sandwiching the wiring member 60 and the fixation target to keep the wiring member 60 and the fixation target fixed to each other.

The non-contact area fixation is adopted as the fixing state of the wiring member 60 to the first service hole cover 40 herein. More specifically, a sheet-like press member 90 is attached to one surface of the first service hole cover 40 while crossing over the wiring member 60 in a state where the wiring member 60 is disposed on one surface of the first service hole cover 40. The press member 90 may be attached to the first service hole cover 40 by a gluing layer (or a gluing agent), an adhesive agent, or welding, for example. When the press member 90 is an adhesive tape, the wiring member 60 is easily held by the first service hole cover 40 by attaching the adhesive tape to the first service hole cover 40 along the wiring member 60. A groove may be formed along a route of the wiring member 60 in the first service hole cover 40. In this case, it is sufficient that the press member 90 is attached to the first service hole cover 40 to cross over the groove while the wiring member 60 is housed in the groove. Accordingly, a positional deviation of the wiring member 60 is suppressed.

The wiring member 60b is held on one surface of the cover body part 41 of the first service hole cover 40 along a route from a lower side toward an upper side, and led into the vehicle door panel 20 through the wiring passing part 44 formed on an upper portion of the frame part 42. Then, the connector 72b on the end portion of the wiring member 60b is connected to a connector on a side of the electrical door mirror 76b.

The wiring members 60c, 60d, and 60e are held on one surface of the cover body part 41 of the first service hole cover 40 along a route branched from the wiring member 60b on a way from the lower side toward the upper side to be directed to the back side, and pass on the frame part 42 and the flange part 43 to be directed to the back side.

The wiring members 60c, 60d, and 60e are directed from the first service hole cover 40 toward the second service hole cover 50, and held on the second service hole cover 50. The structure similar to the structure of holding the wiring members by the first service hole cover 40 described above can be applied to a structure of holding the wiring members 60c, 60d, and 60e by the second service hole cover 50.

The wiring members 60c, 60d, and 60e pass across the frame part 52 and the flange part 53 in a front portion of the second service hole cover 50 to be held on one surface of the cover body part 51 along a predetermined route. Herein, the wiring members 60c, 60d, and 60e are directed from the front side toward the back side along a common route. The wiring member 60e is branched from the wiring members 60c and 60d on a way of the common route to be directed to the lower side. The wiring member 60c is branched from the wiring member 60d on a further back side of the branch portion where the wiring member 60e is branched, and is directed to the upper side. The wiring member 60d remains as it is, and is directed to the back side.

The wiring member 60c is led into the vehicle door panel 20 through the wiring passing part 54 formed on the upper portion of the frame part 52 of the second service hole cover 50. Then, the connector 72c on the end portion of the wiring member 60c is connected to a connector on the side of the handle apparatus 76c in the vehicle door panel 20.

The wiring member 60d passes on the frame part 52 and the flange part 53 on the back portion toward the back side, and is connected to a connector on the side of the door locking actuator 76d on the outer side of the vehicle door panel 20.

The wiring member 60e passes on the frame part 52 and the flange part 53 on the lower portion toward the lower side, and is connected to a connector on the side of the foot lamp 76e on the outer side of the vehicle door panel 20.

The plurality of wiring members 60 include the connection route portion 46 connecting the first service hole cover 40 and the second service hole cover 50, and being bendable. In the present embodiment, a part of the wiring members 60c, 60d, and 60e in the extension direction in the plurality of wiring members 60 is the connection route portion 46. More specifically, a portion between the first service hole cover 40 and the second service hole cover 50 in the wiring members 60c, 60d, and 60e as the second wiring members is the connection route portion 46. The connection route portion 46 may include the other wiring member such as a part of the wiring member connecting the door apparatuses in the extension direction, for example.

The wiring members 60c, 60d, and 60e are held by each of the first service hole cover 40 and the second service hole cover 50 in the same arrangement order in a parallel state. Thus, a part of the wiring members 60c, 60d, and 60e in the extension direction is arranged in a flat state in the connection route portion 46.

A base member 48 more reliably keeping a part of the wiring members 60c, 60d, and 60e in the extension direction in a flat state may be provided to the connection route portion 46. In the present embodiment, the base member 48 is a bendable sheet material 48. For example, the base member 48 is the bendable sheet material 48 such as a non-woven cloth, a solid resin sheet, or a lamination sheet thereof. A part of the wiring members 60c, 60d, and 60e in the extension direction is fixed to one surface of the sheet material 48 described above in a parallel state. A structure of fixing the wiring members 60c, 60d, and 60e to the sheet material 48 may be similar to that of fixing the wiring member 60 to the first service hole cover 40 described above. For example, a part of the wiring members 60c, 60d, and 60e may be fixed to the sheet material 48 by welding such as ultrasonic welding.

The base member 48 may not be a sheet material. For example, the base member 48 may be a flat corrugate tube.

The base member 48 described above is fixed to the first service hole cover 40 and the second service hole cover 50. In the present embodiment, one end portion of the sheet material 48 is fixed to the flange part 43 in the back portion of the first service hole cover 40, and the other end portion of the sheet material 48 is fixed to the flange part 53 on the front portion of the second service hole cover 50. The sheet material 48 may be fixed to service hole covers 40 and 50 by a gluing layer (or a gluing agent), an adhesive agent, or welding, or may also be fixed with a screw, a rivet, or a clip, for example.

The connection route portion 46 described above is provided to cross over the protrusion portion 25p of the inner panel 22 between the first service hole 26 and the second service hole 27 from a side of protrusion thereof (refer to FIG. 2). When the connection route portion 46 is kept in a flat state, a large protrusion of the connection route portion 46 to the vehicle interior side from the inner panel 22 is suppressed even when the connection route portion 46 crosses over the protrusion portion 25*p*, and the connection route portion 46 can be easily disposed in a narrow space between the inner panel 22 and the design trim 16.

The base member 48 needs not be necessarily provided to the connection route portion 46. It is sufficient that the connection route portion 46 can be bended, thus needs not be necessarily kept in a flat state. The plurality of wiring members 60 may be in a separated state in the connection route portion 46, or may also be bundled by an adhesive tape or a banding band, for example.

According to this door wiring module 30, the plurality of wiring members 60 include the wiring member 60*b* held by the first service hole cover 40 to be directed to the electrical door mirror 76*b* as the first door apparatus and the wiring members 60*c*, 60*d*, and 60*e* held by the second service hole cover 50 to be directed to the handle apparatus 76*c*, the door locking actuator 76*d*, and the foot lamp 76*e* as the second apparatuses. Thus, the wiring member 60*b* can be easily connected to the electrical door mirror 76*b* while the first service hole 26 is covered by the first service hole cover 40. In the similar manner, the wiring members 60*c*, 60*d*, 60*e* can be easily connected to the handle apparatus 76*c*, the door locking actuator 76*d*, and the foot lamp 76*e* while the second service hole 27 is covered by the second service hole cover 50.

The plurality of wiring members 60 include the connection route portion 46 connecting the first service hole cover 40 and the second service hole cover 50, and being bendable. Thus, the connection route portion 46 can be extended or bended in accordance with a distance from the first service hole 26 to the second service hole 27. Thus, when the distance from the first service hole 26 to the second service hole 27 is changed for the plural types of doors 10 each having a different size, the same type of door wiring module 30 can be incorporated into such doors 10. Thus, the door wiring module 30 can be made to easily deal with a difference of a size of the door 10.

Figure 5:
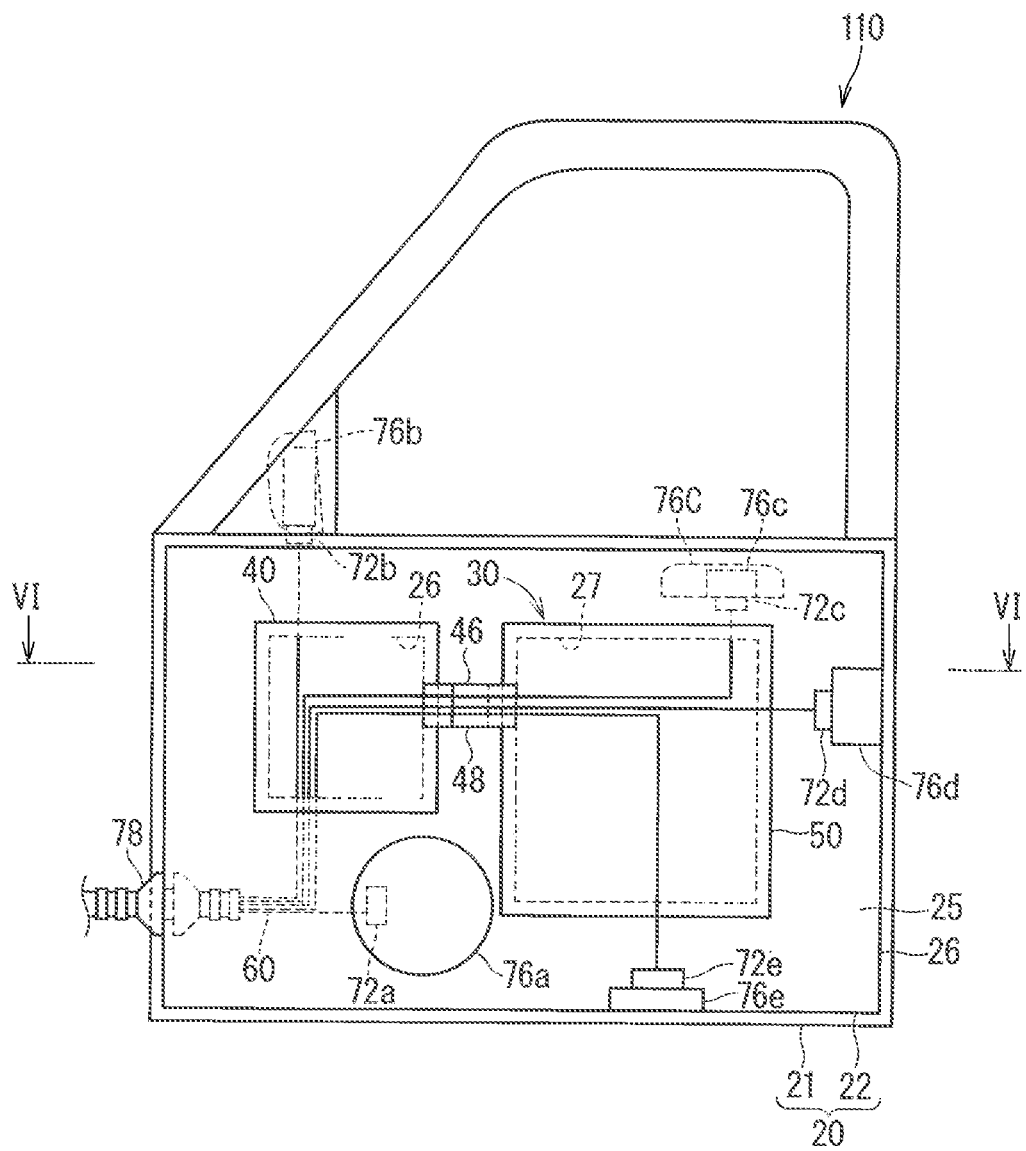
FIG. 5 is a schematic side view illustrating the other door into which a door wiring module is incorporated.
Figure 6:
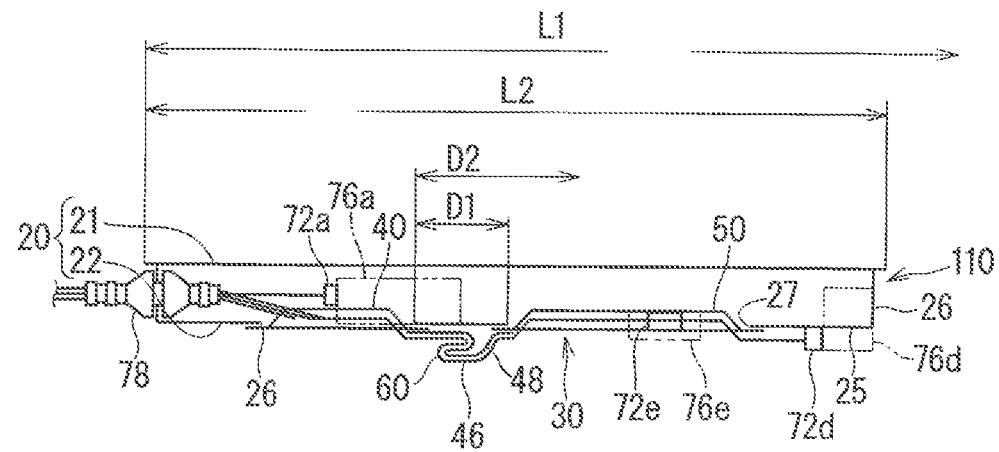
FIG. 6 is a schematic cross-sectional view of the door wiring module along a VI-VI line in FIG. 5.

This point is described in more detail with reference to the door 10 illustrated in FIG. 1 and FIG. 2 and a door 110 illustrated in FIG. 5 and FIG. 6.

That is to say, when a vehicle rank is different, a front-back length may be different between the doors 10 and 11 in some cases. For example, it is assumed that the front-back length of the door 10 is L1 and the front-back length of the door 110 is L2. In the meanwhile, assumed is a case where the door apparatuses 76*a*, 76*b*, 76*c*, 76*d*, and 76*e* are not significantly different from each other even when the vehicle rank is different. In such a case, when the door wiring module is designed solely for each of the doors 10 and 110, design cost, manufacturing cost, and management cost increase. Thus, an operation service hole is divided into the first service hole 26 and the second service hole 27 in the door 10 and the door 110. Then, the route of the wiring member 60*b* for the door apparatus 76*b* near the first service hole 26 is guided by the first service hole cover 40 provided to the first service hole 26. The routes of the wiring members 60*c*, 60*d*, and 60*e* for the door apparatuses 76*c*, 76*d*, 76*e* near the second service hole 27 are guided by the second service hole cover 50 provided to the second service hole 27.

The first service hole 26 and the second service hole 27 are set to substantially have the same shape and size between the door 10 and the door 110. Herein, the state where the first service hole 26 and the second service hole 27 are set to substantially have the same shape and size indicates that they have the same shape and size within a range that they can be covered by the same first service hole cover 50 or second service hole cover 50, for example. Then, it is considered to deal with the difference of the size between the door 10 and the door 110, particularly the front-back lengths L1 and L2 by the difference between the distances D1 and D2 from the first service hole 26 to the second service hole 27. That is to say, in the door 10 having the front-back length L1, the distance from the first service hole 26 to the second service hole 27 is the distance D1, and in the door 110 having the front-back length L2 shorter than L1, the distance D2 from the first service hole 26 to the second service hole 27 is set to be smaller than the distance D1 described above.

In this case, in the door 10 having the front-back length L1, for example, it is sufficient that the first service hole cover 40 and the second service hole cover 50 are attached to the first service hole 26 and the second service hole 27, and the connection route portion 46 described above extends along a surface portion of the inner panel 22 between the holes 26 and 27. In the meanwhile, in the door 10 having the front-back length L2 shorter than L1, in the manner similar to the configuration described above, it is sufficient that the first service hole cover 40 and the second service hole cover 50 are attached to the first service hole 26 and the second service hole 27, and the connection route portion 46 described above are bended in accordance with the distance D2 between the holes 26 and 27. For example, in a case where the connection route portion 46 has a size matching the interval D1 of the door 10 described above, when the door wiring module 30 designed and manufactured in the similar manner is incorporated into the door 110, a portion of the connection route portion 46 obtained by subtracting the interval D2 from the interval D1 is redundant. This redundant portion may be folded to be overlapped on the inner panel 22. The connection route portion 46 may be bended to be curved to an upper side or a lower side between the holes 26 and 27. In any case, when the connection route portion 46 can be bended, the connection route portion 46 can be bended to be housed between the holes 26 and 27 in accordance with the intervals D1 and D2. It is also possible to easily deal with the other different door having a different front-back length by bending the connection route portion 46 in accordance with the interval between the holes 26 and 27 in the manner similar to the configuration described above. An additional service hole may be further provided, and in this case, an additional service hole cover may be further provided.

In this manner, according to the present door wiring module 30, the same type of door wiring module 30 can be assembled to the door 10 having the different front-back length by bending the connection route portion 46 in accordance with the interval between the holes 26 and 27. As a result, the door wiring module 30 can be made to easily deal with the difference of the size of the doors 10 and 110.

Needless to say, a door apparatus to be incorporated and a position of the door apparatus may be different in a case where a vehicle rank is different, and in such a case, the wiring member 60 may be added or omitted, or a part of a route of the wiring member may be changed in accordance with the door apparatus to be incorporated and the position of the door apparatus.

The wiring member 60*b* is guided toward the electrical door mirror 76*b* from the vehicle body apparatus 14 via the first service hole cover 40, and the wiring members 60*c*, 60*d*, and 60*e* are guided toward the door handle apparatus 76*c*, the door locking actuator 76*d*, and the foot lamp 76*e* from the vehicle body apparatus 14 via the first service hole cover 40 and further the second service hole cover 50. Thus, the wiring members 60*b*, 60*c*, 60*d*, and 60*e* can be collected to reach the first service hole cover 40 and then branched, thus a lead-out operation of the wiring members 60b, 60c, 60d, and 60e can be easily performed. A part of the wiring members 60c, 60d, and 60e can be used as the connection route portion 46.

The wiring member 60b held by the first service hole cover 40 can be easily connected to the electrical door mirror 76b provided on the front side of the door 10 in many cases.

The wiring members 60c and 60d held by the second service hole cover 50 can be easily connected to at least one of the handle apparatus 76c and/or the door locking actuator 76d provided on the back side of the door 10 in many cases.

The connection route portion 46 is in a flat state, thus can be easily bended in the thickness direction, and bending of the connection route portion 46 can be easily adjusted in accordance with the intervals D1 and D2 between the holes 26 and 27. The bending state is easily stabilized.

The base member 48 of the connection route portion 46 is fixed to the first service hole cover 40 and the second service hole cover 50, thus even when the first service hole cover 40 and the second service hole cover 50 are pulled in directions away from each other in transporting and assembling the manufactured door wiring module 30, pull force thereof is received by the base member 48. Accordingly, large pull force acting on the wiring members 60c, 60d, and 60e in the connection route portion 46 is suppressed.

The base member 48 is the sheet material 48, and the wiring members 60c, 60d, and 60e are fixed to the sheet material 48 in a parallel state, thus the connection route portion 46 can be kept as thin as possible.

Such a flat connection route portion 46 crosses over the protrusion portion 25p of the inner panel 22, thus the wiring members 60c, 60d, and 60e can be easily disposed in a narrow space between the protrusion portion 25p and the design trim 16.

Each configuration described in the above embodiments and modification examples thereof can be appropriately combined as long as they are not contradictory.

EXPLANATION OF REFERENCE SIGNS 10, 110 door
14 vehicle body apparatus
16 design trim
18 rail
20 vehicle door panel
21 outer panel
22 inner panel
23 side plate part
25 main plate part
25p protrusion portion
26 first service hole
27 second service hole
30 door wiring module
40 first service hole cover
41, 51 cover body part
42, 52 frame part
43, 53 flange part
44, 54 wiring passing part
46 connection route portion
48 sheet material (base member)
50 second service hole cover
60, 60a wiring member
60b wiring member (first wiring member)
60c, 60d, 60e wiring member (second wiring member)
61 core wire
62 covering layer
70 vehicle body side connector
72a, 72b 72c, 72d, 72e connector
76C handle
76a speaker apparatus (door apparatus)
76b electrical door mirror (first door apparatus)
76c door handle apparatus (second door apparatus)
76d door locking actuator (second door apparatus)
76e foot lamp (second door apparatus)
78 grommet
90 press member

The invention claimed is:

1. A door wiring module assembled to a vehicle door panel including an outer panel and an inner panel, comprising:
a first service hole cover covering a first service hole formed in the inner panel;
a second service hole cover covering a second service hole formed in the inner panel; and
a plurality of wiring members, wherein
the plurality of wiring members include:
a first wiring member held by the first service hole cover to be directed to a first door apparatus; and
a second wiring member held by the second service hole cover to be directed to a second door apparatus, and
the plurality of wiring members include a connection route portion connecting the first service hole cover and the second service hole cover, and being bendable.

2. The door wiring module according to claim 1, wherein
the first wiring member is guided from a vehicle body apparatus toward the first door apparatus via the first service hole cover,
the second wiring member is guided from a vehicle body apparatus toward the second door apparatus via the first service hole cover and further the second service hole cover, and
the connection route portion includes a portion of the second wiring member provided between the first service hole cover and the second service hole cover.

3. The door wiring module according to claim 1, wherein
the first wiring member includes a door mirror wiring member connected to an electrical door mirror as the first door apparatus.

4. The door wiring module according to claim 1, wherein
the second wiring member includes at least one of a door locking wiring member connected to a door locking actuator as the second door apparatus and/or a door handle wiring member connected to a door handle apparatus as the second door apparatus.

5. The door wiring module according to claim 1, wherein
the connection route portion is a portion where a part of the plurality of wiring members in an extension direction is arranged in a flat state.

6. The door wiring module according to claim 5, wherein
the connection route portion includes a base member keeping a part of the plurality of wiring members in an extension direction in a flat state, and
the base member is fixed to the first service hole cover and the second service hole cover.

7. The door wiring module according to claim 6, wherein
the base member is a bendable sheet material, and
a part of the plurality of wiring members in an extension direction is fixed to the sheet material.

8. The door wiring module according to claim 5, wherein
the connection rout portion is provided to cross over a protrusion portion of the inner panel between the first service hole and the second service hole.

* * * * *